(12) United States Patent
Krumroy et al.

(10) Patent No.: US 7,249,066 B1
(45) Date of Patent: Jul. 24, 2007

(54) INTERNET-BASED SALES AID

(75) Inventors: Robert E. Krumroy, Greensboro, NC (US); Kris O. Tyte, Concord, NC (US)

(73) Assignee: Identity Branding Incorporated, Greensboro, NC (US)

( * ) Notice: Subject to any disclaimer, the term of this patent is extended or adjusted under 35 U.S.C. 154(b) by 667 days.

(21) Appl. No.: 09/810,090

(22) Filed: Mar. 16, 2001

(51) Int. Cl.
G06F 17/30 (2006.01)
(52) U.S. Cl. .............................. 705/27; 705/14; 705/26
(58) Field of Classification Search ................. 705/25, 705/26, 27, 14
See application file for complete search history.

(56) References Cited

U.S. PATENT DOCUMENTS

| | | | | |
|---|---|---|---|---|
| 5,555,496 | A | | 9/1996 | Tackbary et al. ........... 364/401 |
| 5,905,492 | A | * | 5/1999 | Straub et al. ................. 715/44 |
| 5,938,727 | A | * | 8/1999 | Ikeda ......................... 709/218 |
| 5,960,412 | A | | 9/1999 | Tackbary et al. ............. 705/27 |
| 6,008,807 | A | * | 12/1999 | Bretschneider et al. ..... 715/732 |
| 6,055,510 | A | * | 4/2000 | Henrick et al. ............... 705/14 |
| 6,092,054 | A | | 7/2000 | Tackbary et al. ............. 705/27 |
| 6,470,338 | B1 | * | 10/2002 | Rizzo et al. .................... 707/6 |
| 6,618,747 | B1 | * | 9/2003 | Flynn et al. ................. 709/206 |
| 6,836,792 | B1 | * | 12/2004 | Chen .......................... 709/220 |
| 6,889,213 | B1 | * | 5/2005 | Douvikas et al. ............. 705/67 |
| 2001/0005855 | A1 | * | 6/2001 | Shaw et al. .................. 709/206 |
| 2002/0016756 | A1 | * | 2/2002 | Rinaldi ........................ 705/36 |
| 2002/0087404 | A1 | * | 7/2002 | Silkey et al. ................. 705/14 |

FOREIGN PATENT DOCUMENTS

JP 1126721 A1 * 8/2001

OTHER PUBLICATIONS

Businesswire, "Sharing digital photographs online has never been easier; encoding.com launches online application that enables consumers to create and share streaming video", dated Oct. 5, 1999.*
register.com-Domain Name Registration Services; information from the internet, copyright 1995.
Afternic.com Members; information from the internet, copyright 1999.
Blue Mountain-The World's Favorite eCards; information from the internet, copyright 2001.

* cited by examiner

Primary Examiner—Mark Fadok
(74) Attorney, Agent, or Firm—MacCord Mason PLLC

(57) ABSTRACT

An apparatus for aiding in a sales effort includes a website accessible by a salesperson and having programming and storage of multiple communications. The website permits the salesperson to select a desired communication for the prospect to see and enables the salesperson to input an identification of a prospect to be sent an email that includes a link to a website address configured to show the prospect a communication selected by the salesperson. The website displays the communication to the prospect when accessed using the link, including multiple screens viewable by the prospect in sequence, provoked by the prospect. The communication permits the prospect to indicate that more information is desired and records this data for the salesperson. The website stores information about the prospect's viewing of the communication and sends an email to the salesperson when the prospect has reviewed the communication.

35 Claims, 20 Drawing Sheets

Saturday, March 3

Fields in Bold are required. For help with this form click here

Concept to Send

`--Choose One--`

☐ Prefix `Dr.` ⊙ Personal ○ Business

Recipient's Name
For example:
Dr. John P. Smith, III

☑ First `Joe`

 Get Name From Address Book

☐ Middle `M.`

☑ Last `Prospect`

☐ Suffix

Email Address
`joepropect@prospectplace.com`

Subject

Here is the information we spoke ab

Message
For example:
Dear Jack Prospect,
The rest of your message...

Your Link will appear here.
This is not a download or an attachment. It is a direct link. Simply click on the link below to access the information.
http://www.emailconcept.com/finance.asp?for=jackprospect Sincerely,
Joe Financial Advisor

Message Close
For example:
Sincerely,
Joe Financial Advisor

FIGURE 3

Saturday, March 3

Warning! Please Realize that Clicking "Generate Batch" Will Cause EVERYONE Set to Active in Your Address Book to Receive the Concept You Select.

Concept to send?

> Business Buy - Sell

Message
  For example:
  Dear Jack Prospect,
  The rest of your message...

> Here is the information we spoke ab

Your Link will appear here.

This is not a download or an attachment. It is a direct link.
Simply click on the link below to access the information.
http://www.emailconcept.com/finance2.asp?for=jackprospect Message Close
  For example:
  Sincerely,
  Joe Financial Advisor > Sincerely,
> Joe Financial Advisor

FIGURE 7

Sales Person's Processing and interaction with Website, prospect and email system

| Steps | Reference number |
|---|---|
| Salesperson telephones prospect to request opportunity to provide information by email | 22 |
| Salesperson logs onto website through password-protected access | 24 |
| Salesperson inputs data about prospect into address book | 30 or 32 |
| Salesperson<br>    accesses generator page,<br>    inputs address or selects from address book,<br>    selects communication to send,<br>    inputs email text from pre-stored text or custom text | 34 |
| Salesperson previews email | 36 |
| Website sends email to prospect | 38, 40 |
| Prospect opens email and clicks on website icon | 40 |
| Prospect's browser calls up website on the Internet and displays first screen of communication to prospect | 44 |
| Prospect pages through the communication or exits. At the last page the prospect may request additional information | 44 to 62 |
| Salesperson's statistics to update the prospect's response to email | 40 |
| Email sent to salesperson reporting on prospects visit<br>    OR<br>Salesperson visits statistics (figure 20) and learns of prospect's visit | 64 |
| Salesperson makes a follow up telephone, email or other contact with the prospect | 66 |

FIGURE 18

| To | Concept | Date Sent | Date Opened | Made To End | Info Requested | Times Opened |
|---|---|---|---|---|---|---|
| Michelle Polczynski | dbo | 2/6/2001 | 2/6/2001 | True | True | 1 |
| Jill Jones | fsw | 2/6/2001 | 2/6/2001 | True | True | 1 |
| Michelle Polczynski | dbo | 2/19/2001 | 2/19/2001 | False | False | 1 |
| sam smith | gh | 2/21/2001 | Not Opened Yet | False | False | 0 |
| sam smith | gh | 2/21/2001 | Not Opened Yet | False | False | 0 |
| Joe Prospect | etp | 2/21/2001 | Not Opened Yet | False | False | 0 |
| bob bob | fsw | 2/27/2001 | Not Opened Yet | False | False | 0 |
| bob bob | fsw | 2/27/2001 | 2/27/2001 | False | False | 2 |
| Sam Smith | di | 2/28/2001 | Not Opened Yet | False | False | 0 |

Concepts Send Totals

| | | | | | | |
|---|---|---|---|---|---|---|
| Disability - Business Owner | | | | | | 2 |
| Disability - Individual | | | | | | 1 |
| Estate Tax Planning | | | | | | 1 |
| Financial Security for Women | | | | | | 3 |
| Group Health | | | | | | 2 |
| Total Number of Concepts Sent for February 2001 | | | | | | 9 |

FIGURE 20

INTERNET-BASED SALES AID

BACKGROUND OF THE INVENTION

The present invention relates to a tool that is useful in a sales and marketing effort.

Sales and marketing have been with us since time immemorial. Sales professionals need to make contact with their prospective customers to be able to show the prospect the value of the product or service being offered. Often, however, prospects hesitate when the salesperson requests an appointment. Customers are skeptical, so prospects are hesitant about granting appointments when they lack information or don't understand the general context about the problem that they may face. In this circumstance the salesperson may lose a sale and the prospect may lose the benefit of the salesperson's product or service.

SUMMARY OF THE INVENTION

The present invention fulfills this need in the art by providing an apparatus for aiding in a sales effort including a website accessible by a salesperson and having programming and storage to enable the salesperson to input an identification of a prospect to be sent an email. The email includes the prospect's email address and a message to send to the prospect that includes a link to a website address configured to show the prospect a communication. The website sends the email to the prospect including the link, and displays the communication to the prospect when accessed using the link.

In a preferred embodiment, the website enables the salesperson to send a batch of emails to prospects. It may also enable the salesperson to maintain an address book of multiple prospects. In the preferred embodiment the website enables the salesperson to customize the email message to the prospect and also enables the salesperson to store a prepared email message to use with various prospects. Preferably, the website enables the salesperson to preview the email message to the prospect and presents information to the salesperson that an email message has been sent to the prospect.

The communication viewed by the prospect preferably includes multiple screens viewable by the prospect, and more preferably shows the screens in sequence, provoked by the prospect. Desirably, the website stores information about the prospect's viewing of the communication. Preferably, the communication permits the prospect to indicate that more information is desired and records this data for the salesperson. The website may send an email to the salesperson when the prospect has reviewed the communication, and also when the prospect has requested additional information.

Preferably, the website stores multiple communications and permits the salesperson to select a desired communication for the prospect to see. In one embodiment, the communications are useful to an insurance salesperson. In another embodiment the communications are useful to a lawyer selling legal services. In another the communications are useful to a restaurateur.

The invention also provides a method of marketing including contacting a prospect to inquire if the prospect would be receptive to an email pertinent to a product or service to be marketed and sending an email to the prospect including a link to a website address configured to show the prospect a communication about a subject matter. When the prospect accesses the website address using the link, the communication is displayed to the prospect. The method includes following up the prospect's interest in the subject matter of the communication with a personal contact to provide further details about the product or service being marketed.

The method may include sending a batch of emails to prospects and may include maintaining an address book of multiple prospects. The method may include customizing the email message to the prospect or sending a stored email message to the prospect. The method preferably includes previewing the email message before sending the email message to the prospect, and may also include observing information that an email message has been sent to the prospect. Preferably, the method includes selecting a desired communication for the prospect to see from multiple stored communications.

The displaying of the communication may include displaying multiple screens to the prospect, preferably viewable by the prospect in sequence, provoked by the prospect. Desirably, the communication prompts the prospect to indicate that more information is desired and records such indications. In addition, it may be desirable to store information about the prospect's viewing of the communication. The method may also include sending an email to the salesperson when the prospect has reviewed the communication, and more particularly when the prospect has requested additional information. In one embodiment the communication is about a subject matter pertinent to insurance. The communication may be about a subject matter pertinent to legal services, a subject matter pertinent to restaurant menu items or customer relations information, or any other topic that can be marketed using the invention.

BRIEF DESCRIPTION OF THE DRAWINGS

The invention will be better understood by a reading of the Detailed Description of the Preferred Embodiments along with a review of the drawings, in which:

FIG. 3 is a view of text available on a page of a website in accordance with the invention;

FIG. 7 is view of text available on a page of a website in accordance with the invention;

FIG. 18 is a flow chart of a salesperson's operation in accordance with the invention.

FIG. 20 is a screen shot showing the statistics table viewable by a salesperson at the website.

DETAILED DESCRIPTION OF THE PREFERRED EMBODIMENT

Figure 1:
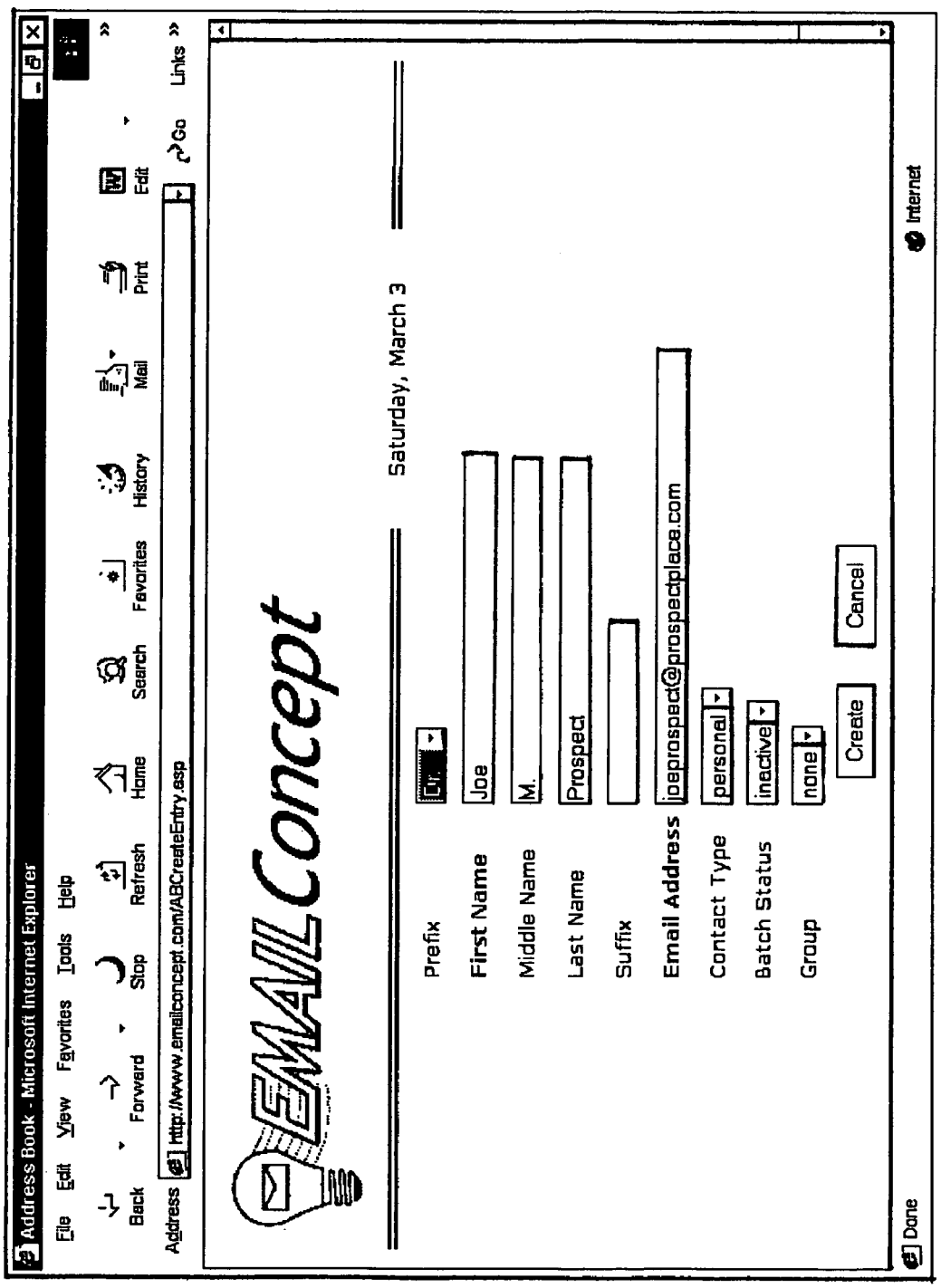
FIG. 1 is a screen shot of a page of a website in accordance with the invention.

The preferred embodiment of the invention includes an email component and a web site component. Both components advantageously operate over the World Wide Web feature of the Internet.

When a salesperson has a prospect that he or she wants to interest in a product, he or she contacts the prospect and briefly asks the prospect for permission to send them an email with some information that the prospect might find useful. When the prospect gives the salesperson the email address, the salesperson can send the email to the prospect. The email includes a message to the effect of "thank you for permitting me to share some information with you. Please click on the attached link to the Internet for the additional information." The email also has the referred-to link. The prospect then clicks on the text for the link in the email to call up an Internet website having information that the salesperson had selected for the prospect to review.

The website will have a number of screens of information for the prospect to review. In particular, for a product such as insurance, a series of screens will be displayed to a prospective customer that describe some of the unfortunate events that may occur from failure to plan and to acquire the products being offered. The screens are shown in a series of about six to eight different screens and culminate in a screen with the option for the customer click to get more information concerning rates and quotes or to simply exit the website.

Information concerning the number of screens that the prospective customer actually reviewed is logged and maintained available for review by the salesperson or a sales administrator, so that the success of the sales program can be evaluated.

When the customer opens the email to begin with, an email may be sent back to the salesperson indicating that the email has been picked up. Similarly, emails from the web site may be sent to the original sender to the effect that the web site has been accessed, and information as to whether the customer has requested more information will also be emailed to the salesperson. Thus, the salesperson will know from the customer's request for more information that the customer's interest is particularly piqued. Alternatively, the information may be posted on the website at a secure site, available to the salesperson, and available for review.

The invention provides for the web site having the capability of offering several different scenarios and products to be marketed, each being available to the salesperson. The salesperson selects which of the products on which to focus with respect to a particular prospect, and the email to the customer provides only a link to the screens at the web site pertinent to that topic. Although the various topics are all housed at the web site, the prospective customer will not be able to browse through them, but will remain focused on the particular problem selected by the salesperson.

One of the unique features of this invention relates to the content of the screens available to the prospective customer at the web site. In particular, the sequence of slides should be configured to show the problem and help convince the prospect of the reality of the problem and its likelihood of occurrence and not go into detail concerning the solutions. Those can then be provided by a salesperson in a follow up contact.

Turning now to FIG. 18, a flow chart of the process according to the preferred embodiment and using a web site in accordance with the preferred embodiment will now be discussed.

When a salesperson identifies a prospect, he or she gets in touch with the prospect, such as by telephone, to request an opportunity to provide information to the prospect by email, at step 22. Assuming that the prospect responds positively and provides his or her email address, the sales person can log onto the website (or this can be done before contacting the prospect) through a password protected access in conventional fashion at step 24. Then, clicking on "create concept," from a menu of choices, the salesperson can begin creating a message to a prospect. The salesperson clicks on an address input button to bring up the screen 30 seen in FIG. 1 into which information about the prospect can be entered, such as by using the salesperson's computer keyboard.

Figure 2:
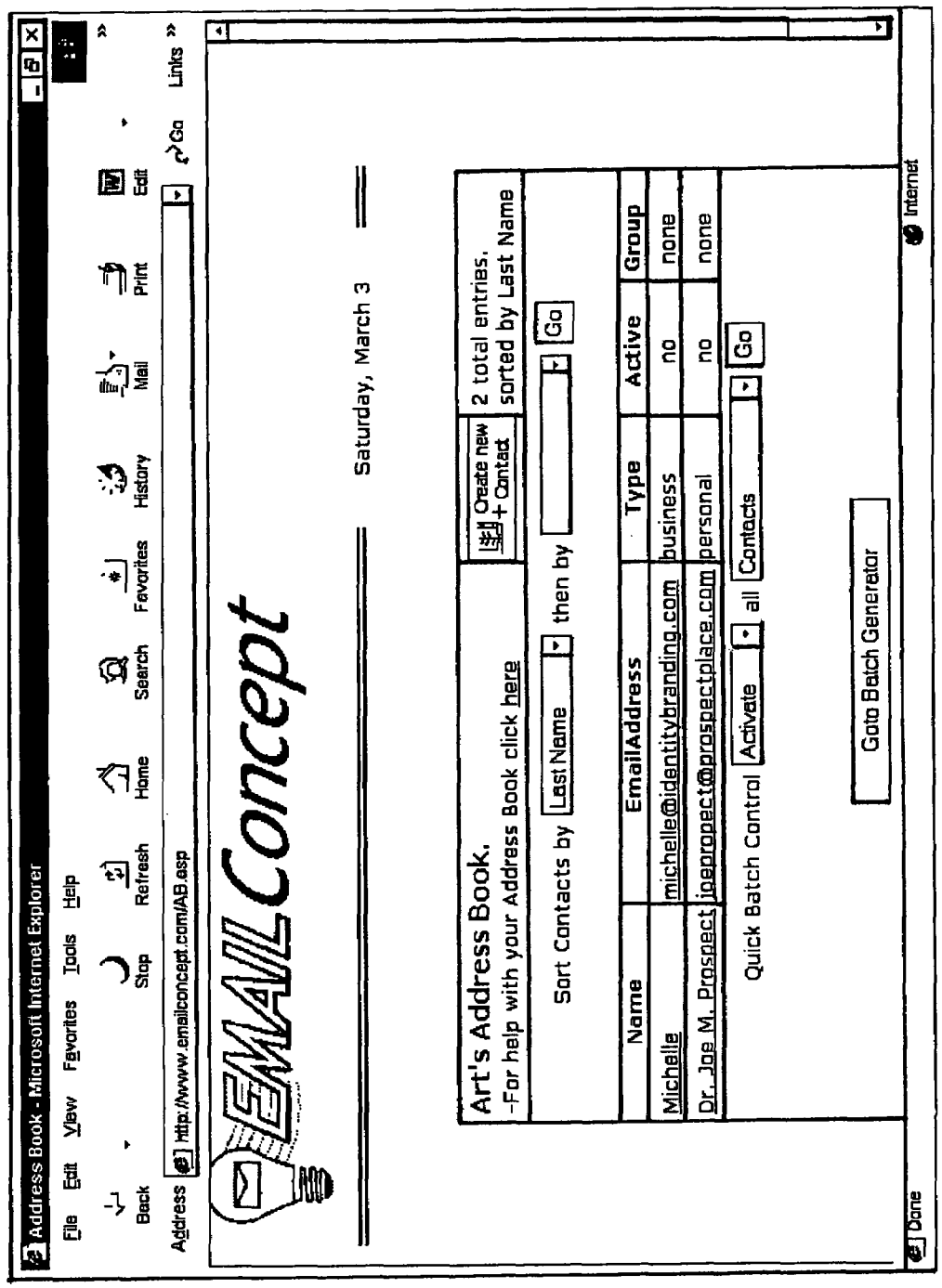
FIG. 2 is a screen shot of a page of a website in accordance with the invention.

Similarly, information about multiple prospects can be viewed, input, and edited in an address book 32, seen in FIG. 2. As will be apparent, the address information can conveniently be stored in a conventional database at the website. Other data storage formats and programs can be substituted.

Once the information about the prospect has been entered, a communication to the prospect can be compiled from a menu page, bringing up the generator page 34 seen in FIG. 3. At the top of the generator page is a dropdown box labeled "choose one." By clicking on the dropdown box activator to the right of that box, numerous titles of messages are displayed, from which the salesperson can select the desired one to go to the prospect. In the field of insurance marketing, topics may include business buy-sell (as exemplified in FIGS. 8-17), college education funding, disability-business owner, disability-individual, estate tax planning, financial security for women, group health, key person, long-term care, paying unnecessary taxes, qualified money transfer, qualified retirement plans, section 125, supplemental non-qualified retirement plans, taxes—the growth killer, umbrella policy, and wealth and strategy planning. Selecting the appropriate title in the dropdown box triggers the nature of the communication that the prospect will see when visiting the website. The other messages may be present on the website, but they will not be accessible to the prospect in response to the email. This generator page 34 also provides space for the direct entry of information about the recipient. Alternatively, the address data may also be retrieved from the address book by clicking the address book icon to the left in the generator page 34.

Figure 4:
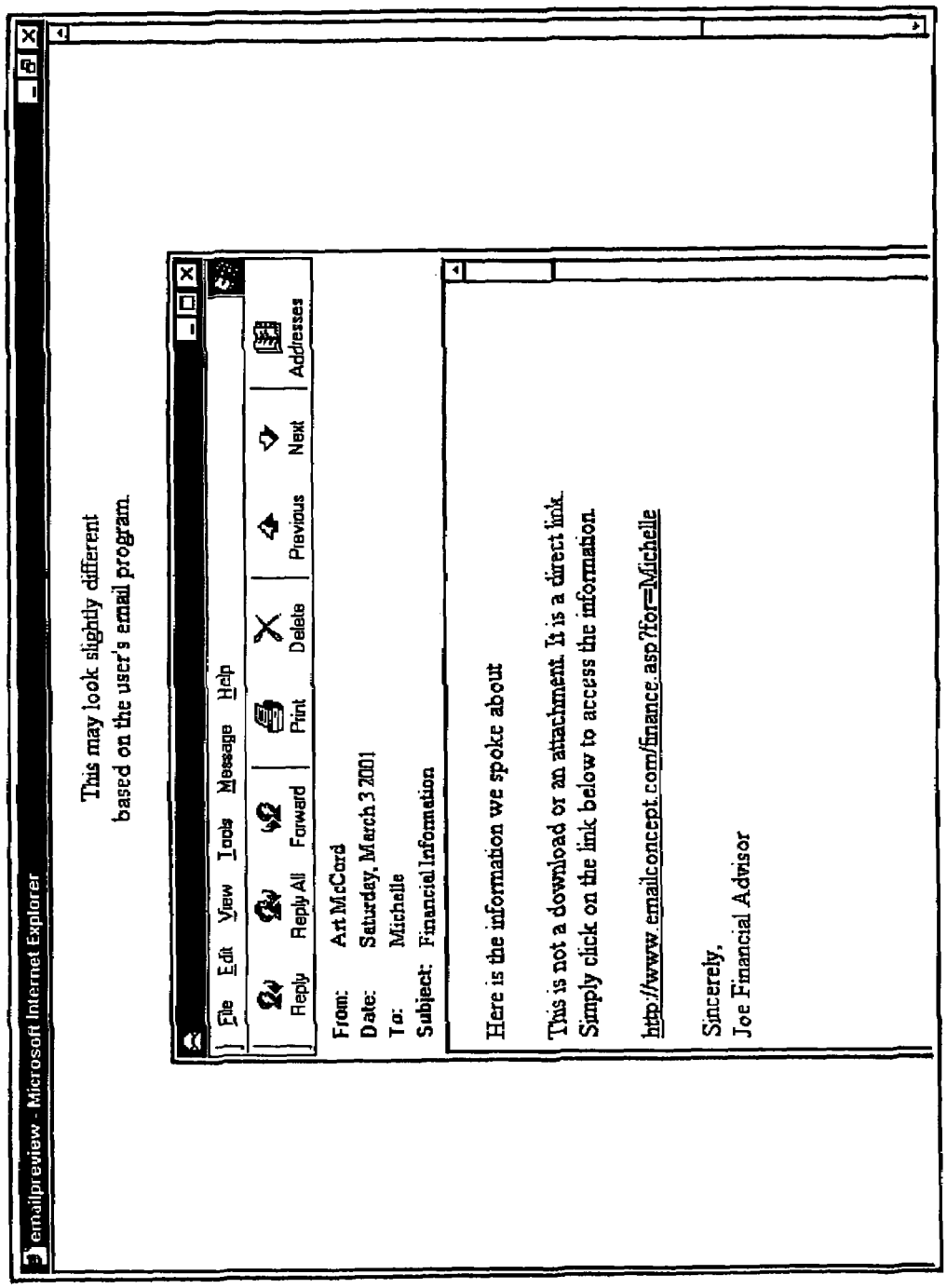
FIG. 4 is a screen shot of a page of a website in accordance with the invention.
Figure 5:
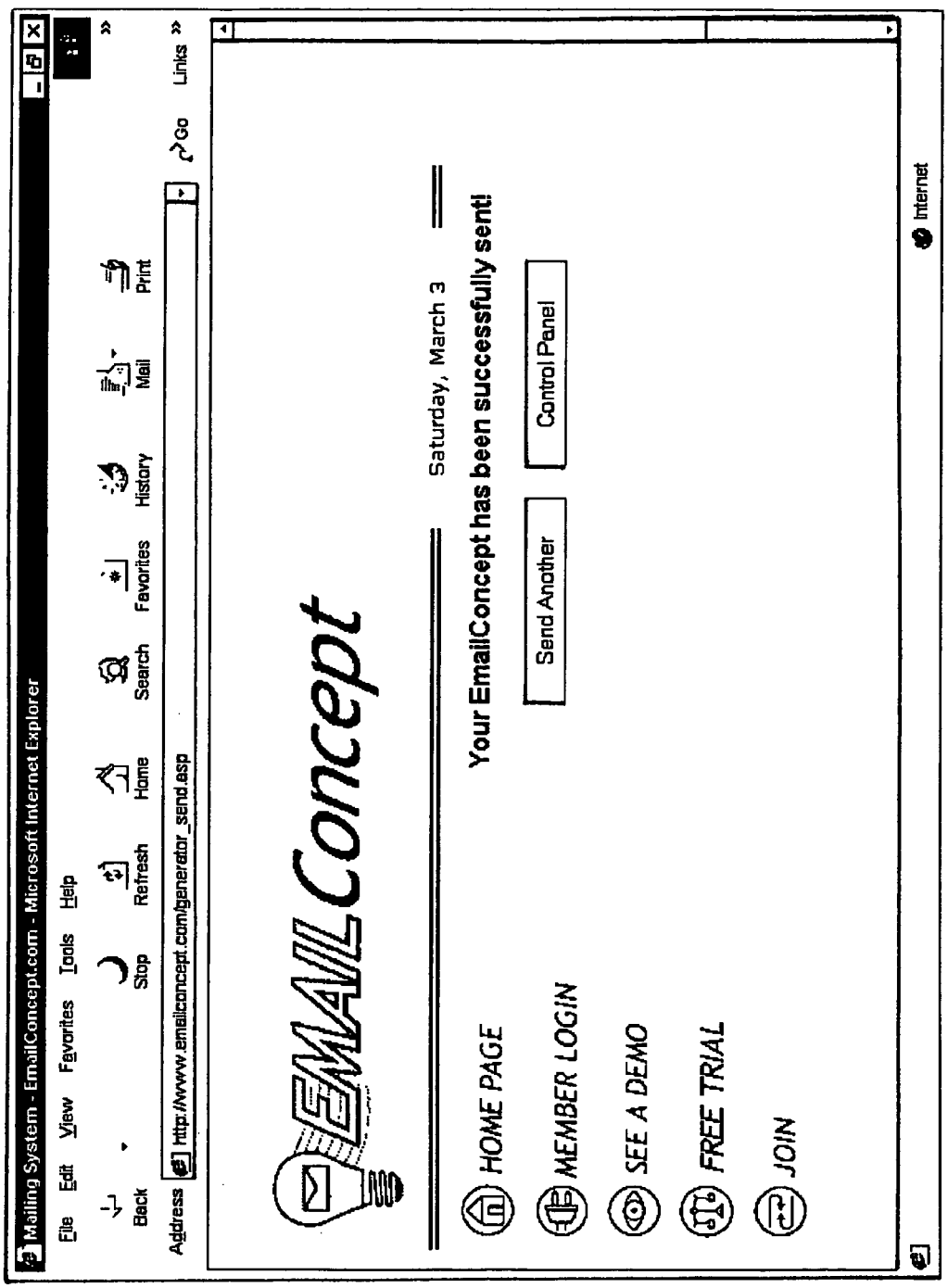
FIG. 5 is a screen shot of a page of a website in accordance with the invention.

The email may have a subject and a message which can be input directly by the salesperson using the keyboard of his or her computer. Alternatively, a default message may be stored and called up in the body of the email message. Sample information of this sort is seen in the text boxes in the lower portion of FIG. 3. An additional button (not visible in FIG. 3) may provide the salesperson with the option of clicking on it to see what the email message will look like as it is sent to a prospect. Such a previewable email message 36 can be seen in FIG. 4. A similar button is clicked to actuate the email, and the website sends the salesperson to screen 38 seen in FIG. 5 informing the salesperson that the email has been sent.

Figure 6:
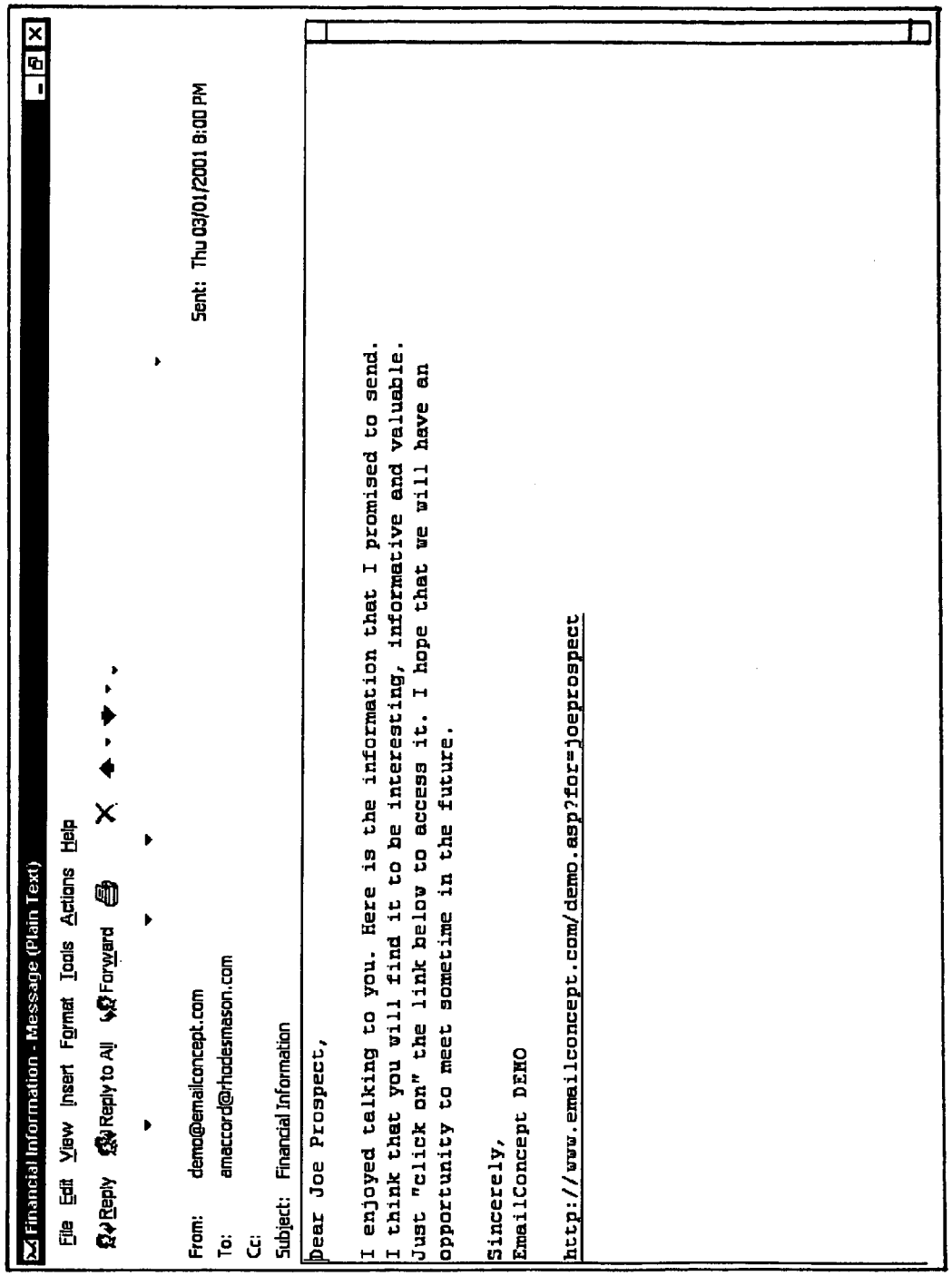
FIG. 6 is a screen shot of an email sent in accordance with the invention.
Figure 8:
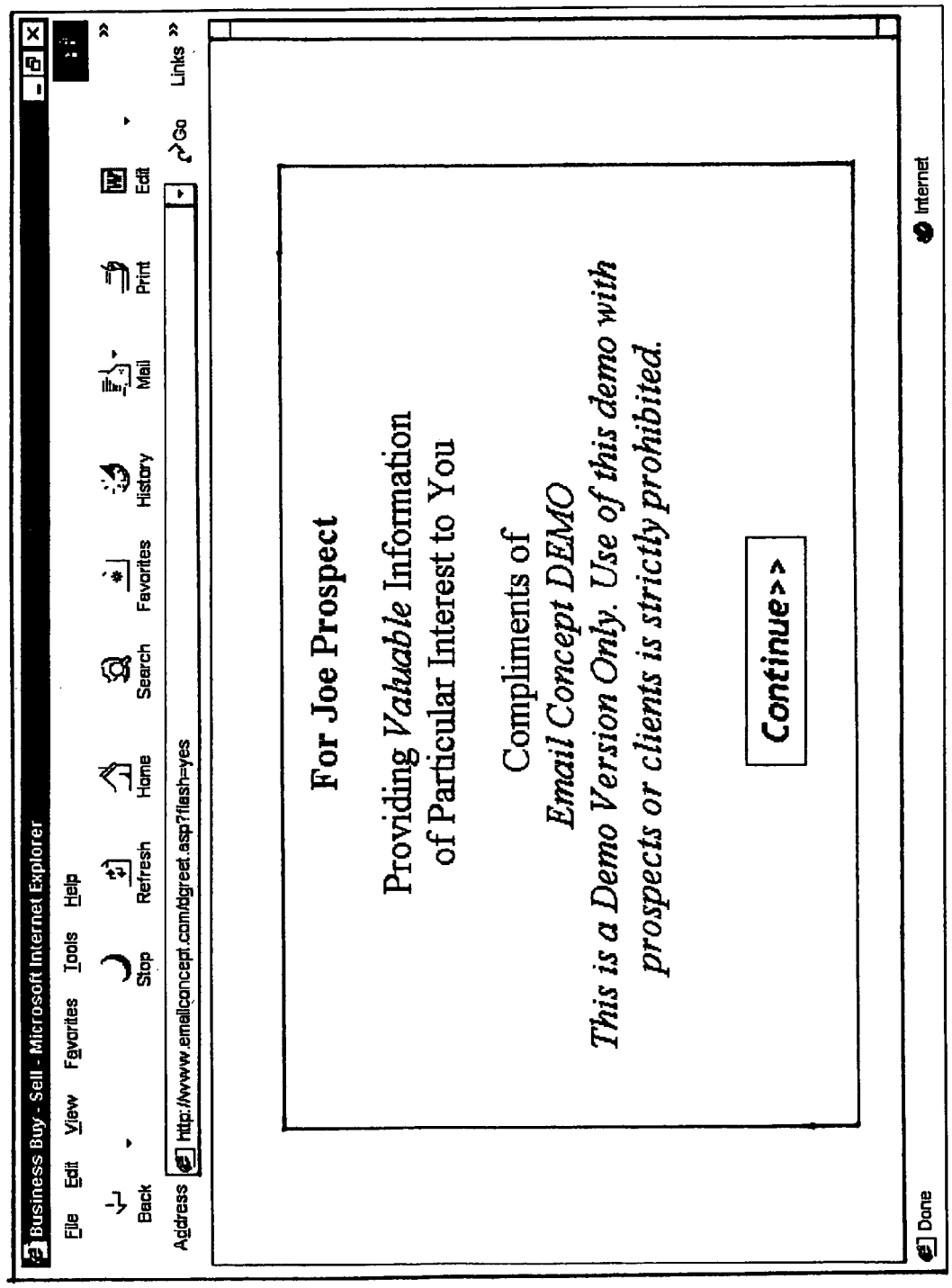
FIGS. 8-17 are screen shots of a communication at a website viewable by a prospect in accordance with the invention.
Figure 9:
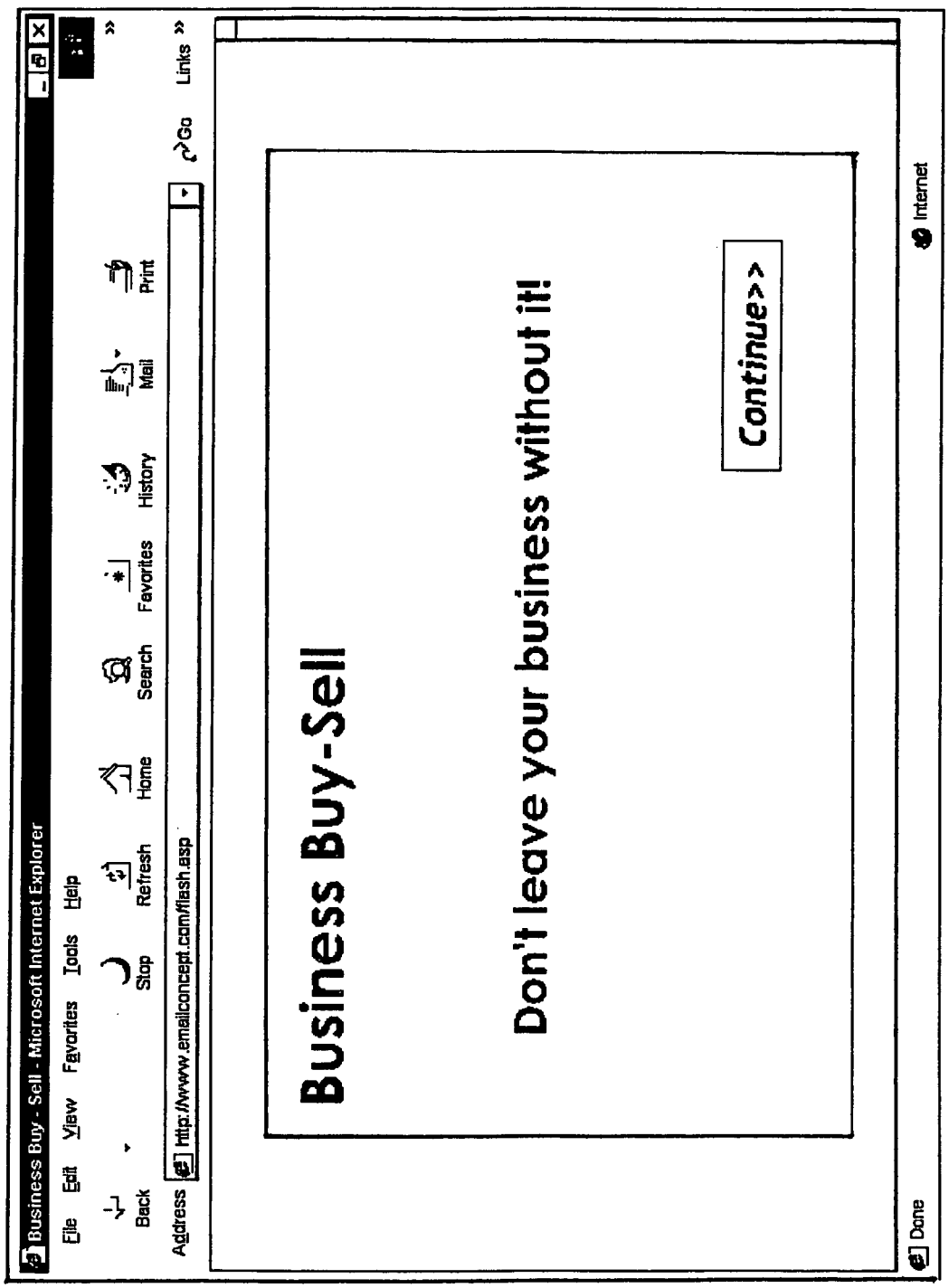
Figure 10:
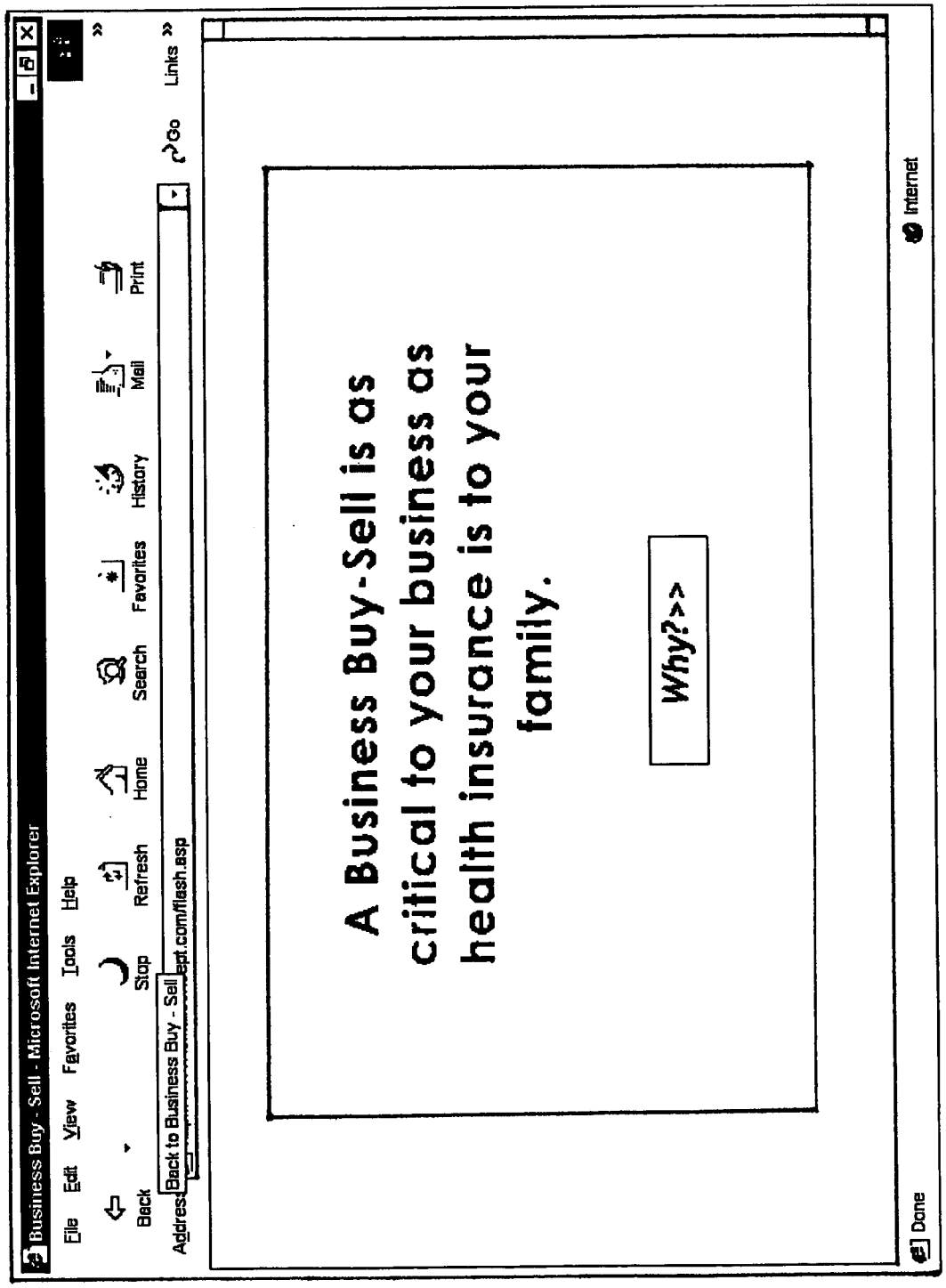
Figure 11:
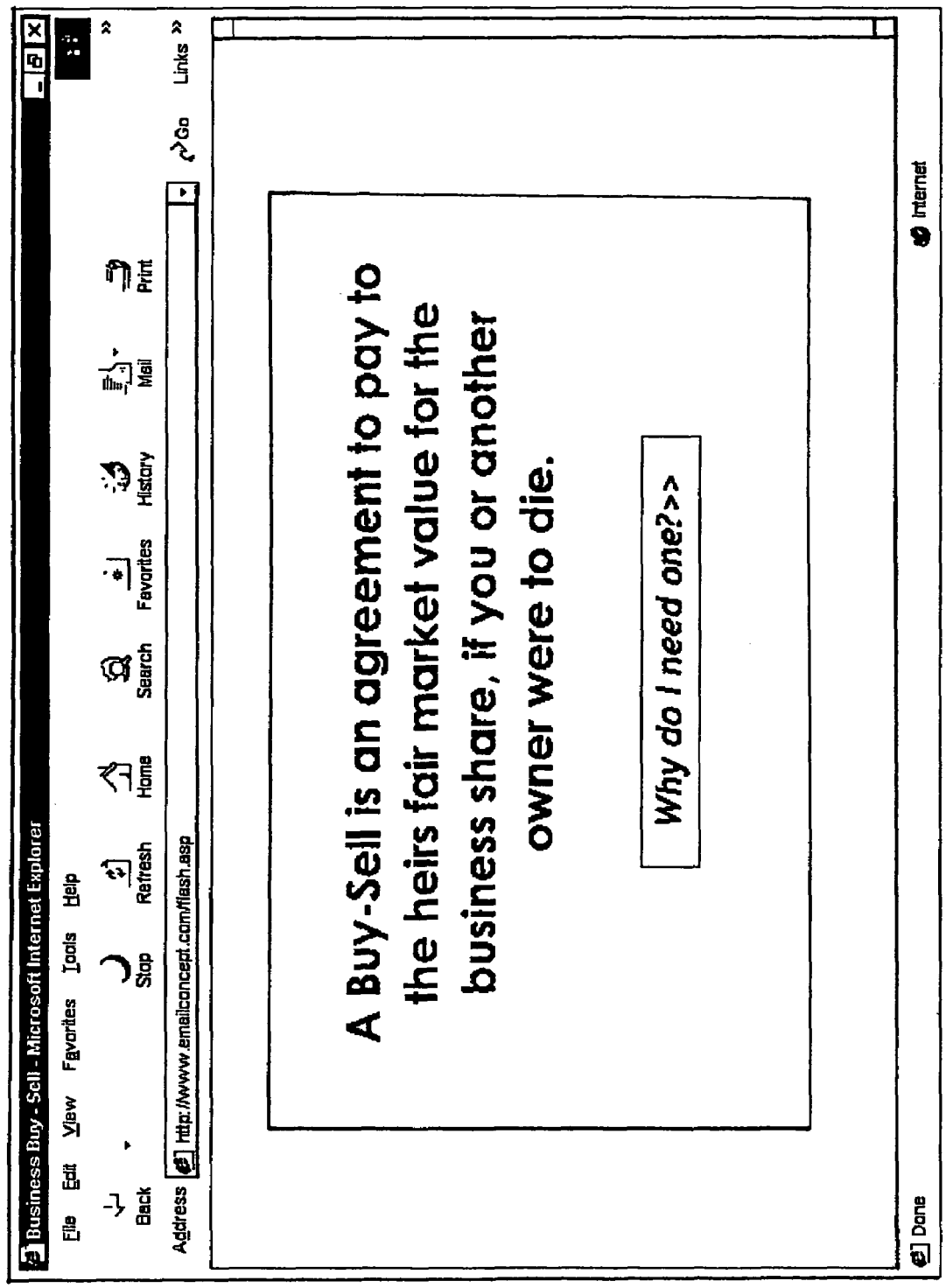
Figure 12:
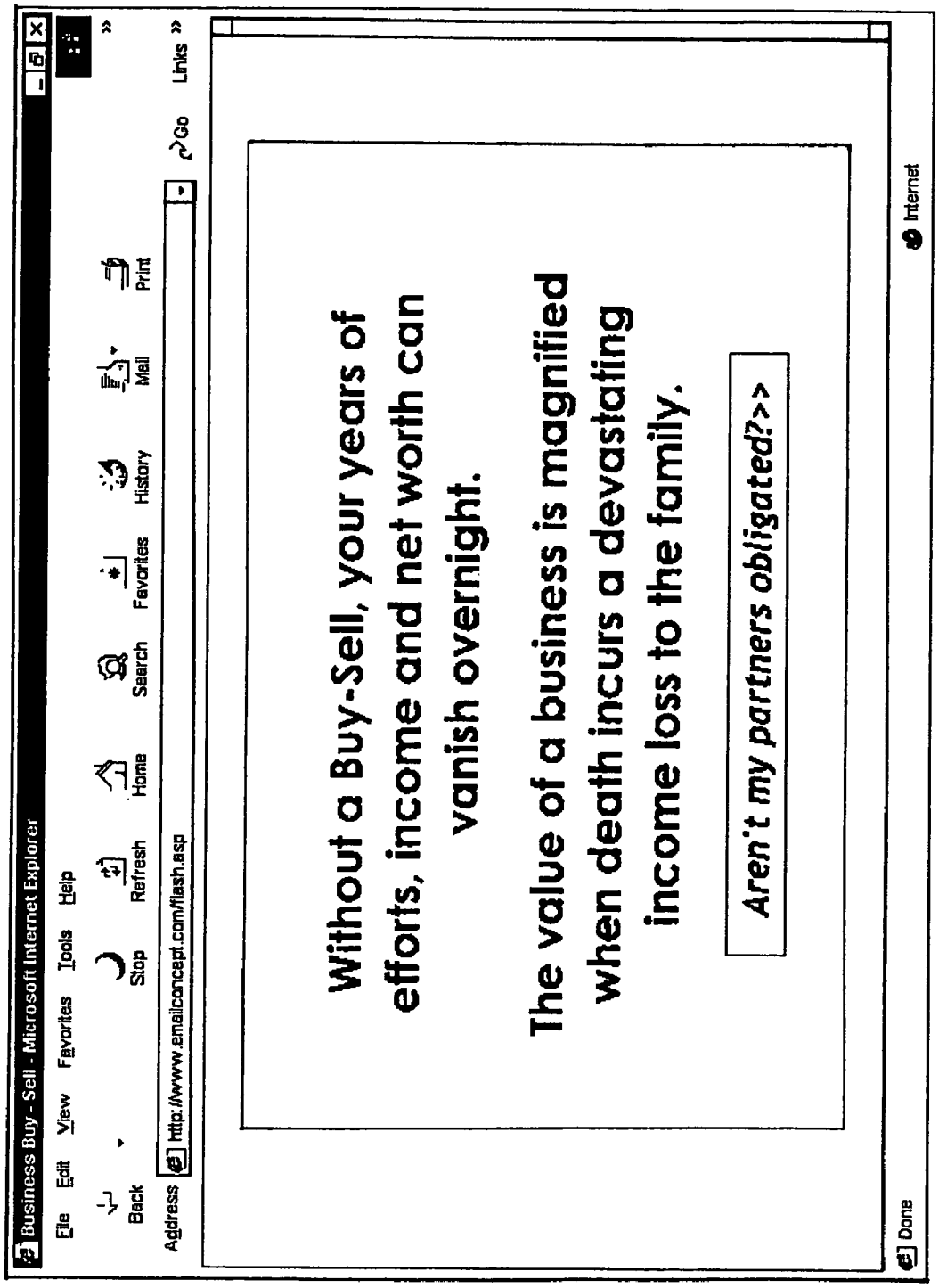
Figure 13:
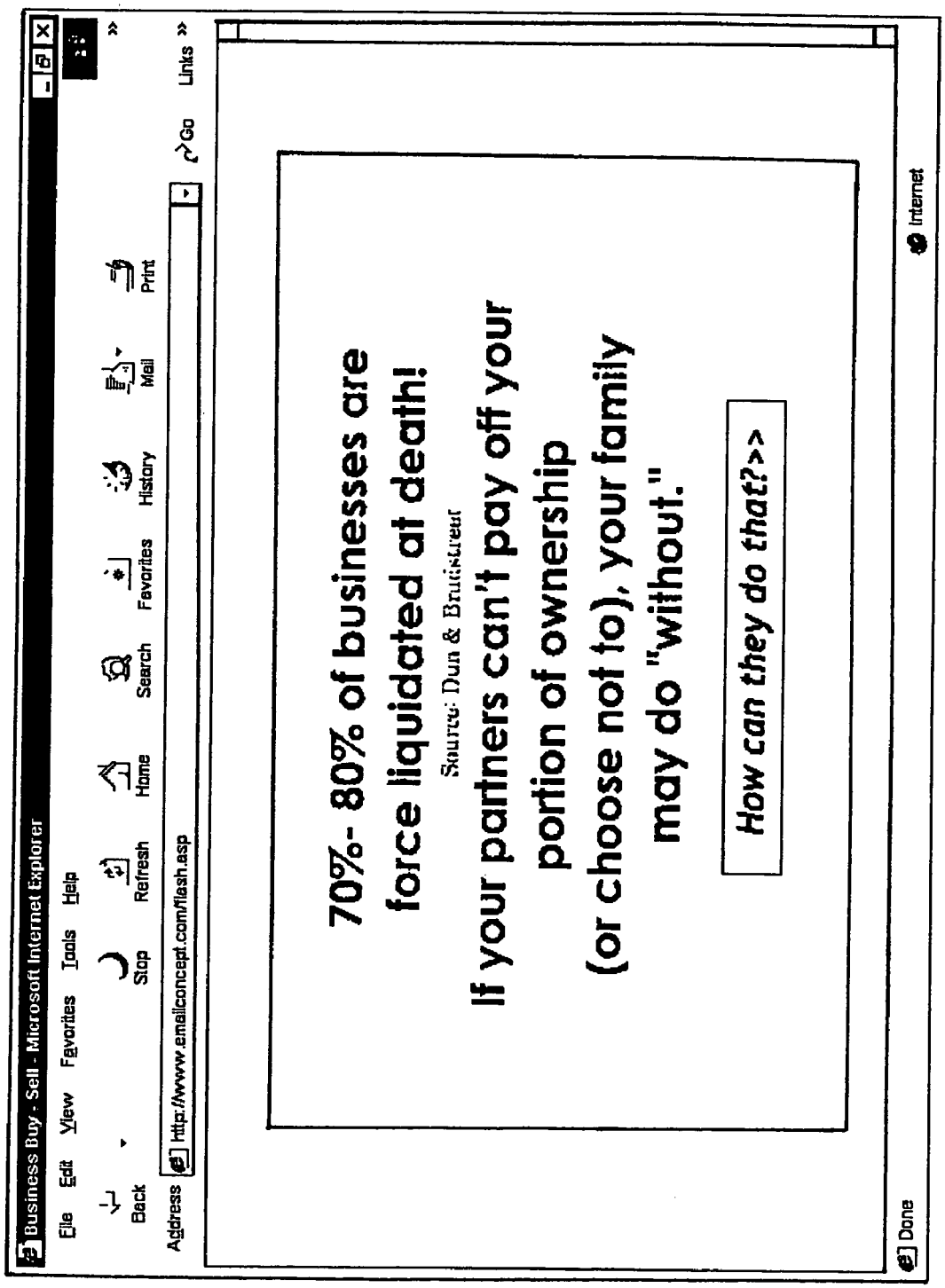
Figure 14:
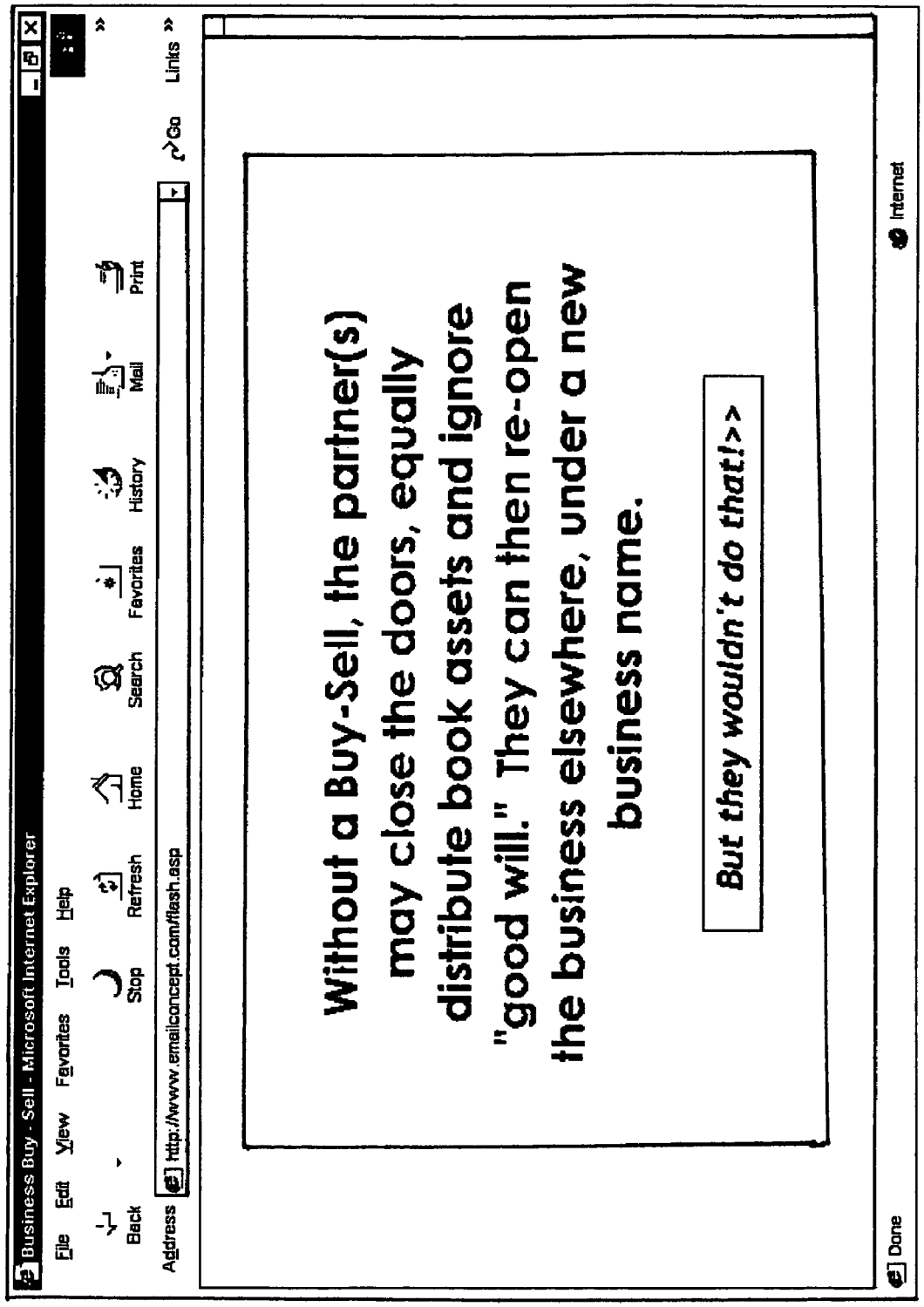
Figure 15:
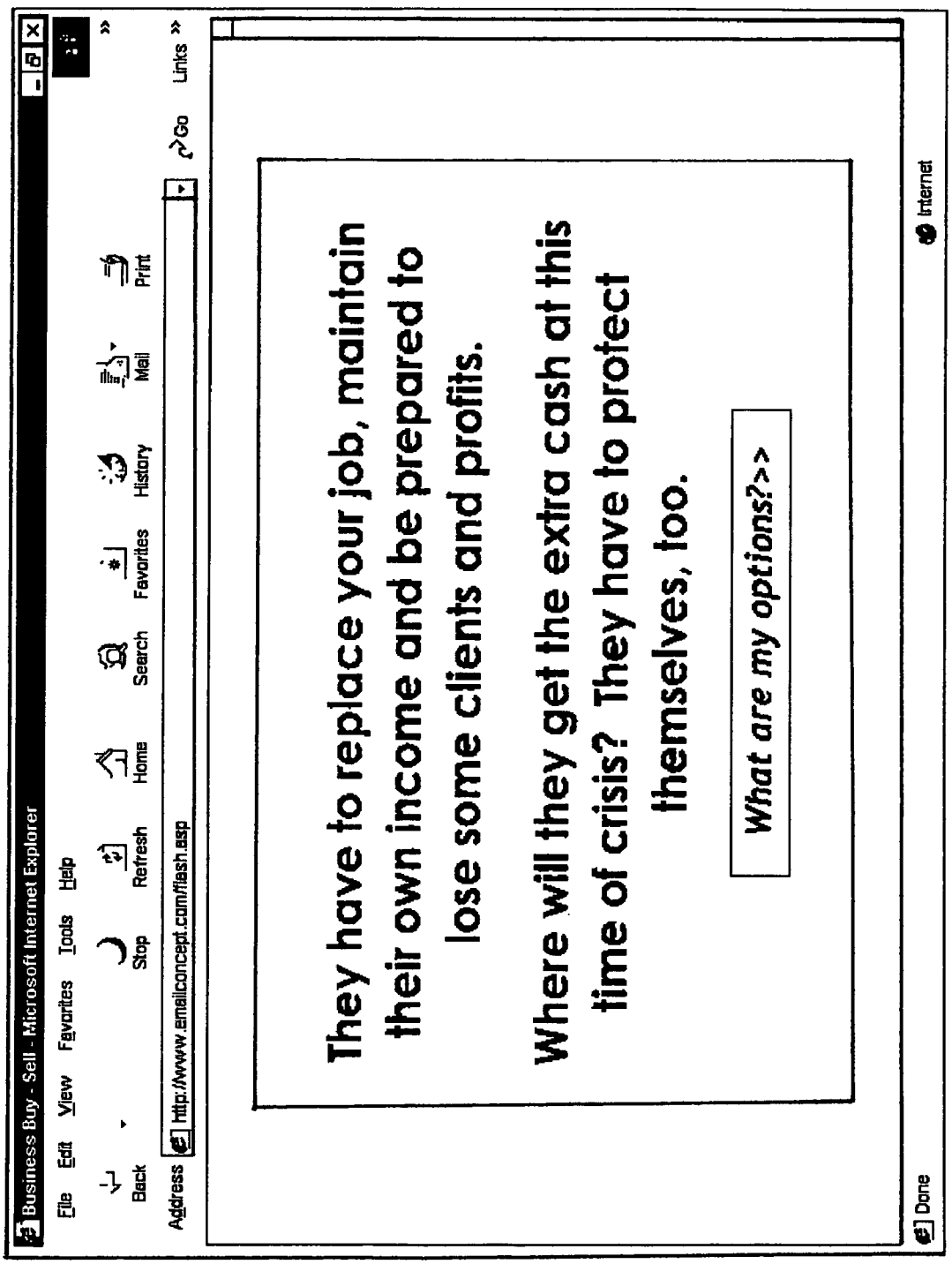

A sample of the email 40 as it might appear to the recipient is seen in FIG. 6. In a Windows environment, the recipient need only click on the hypertext link, which appears in FIG. 6 as http://www.emailconcept.com/demo.asp?for=joeprospect. The web address includes not only the Uniform Resource Locator address for the web site, but also prospect-identifying information. This information works with programming at the website so that the website recognizes the prospect and can select the appropriate communication to show to the prospect. It also is used to build the statistics information discussed below. Clicking on the email link brings up the website message, beginning with the screen 44 shown in FIG. 8.

Alternatively, the salesperson can send the same email to a batch of prospects all at once, using the screen 42 shown in FIG. 7 together with the address book shown in FIG. 2. In the address book shown in FIG. 2, by changing the entry for each addressee desired to be included in the "active" column from no to yes, the email compiled in the batch generator 42 will be sent to each "yes-marked" address in the batch. Each prospect will have a suitable embedded link for him or her to click on to arrive at the website and be shown the appropriate communication.

In the preferred embodiment, the email to the prospect is sent by the website, but it is within the scope of the invention that the salesperson may have software on his or her computer that can directly send an email to the prospect, as above, and also send a message to the website from the sales person's computer to expect the prospect's link with appropriate instructions as to how to respond to the prospect's visit to the website.

The system may be website configured so that the hypertext link in the prospect's email instructs the website directly in which communication to show the prospect. Alternatively, the salesperson's visit (or email) to the website may write to a database with the prospect's identification and the selection of the communication to be shown to the prospect. When the prospect arrives at the website and is identified by virtue of the identifier embedded in the hypertext link, the website uses the database as a look-up table to select the communication to be shown to the prospect.

As seen in FIGS. 8-17, a first screen 44 appears to the prospect with personalized information as an introduction and provides a button labeled "continue>>" to be clicked on to advance to the next screen. The next screen 46 shown in FIG. 9 begins the introduction to the topic and again invites the prospect to continue viewing screens by clicking on the appropriate button. Continuing on screens 48, 50, 52, 54, 56, and 58 in similar fashion, builds upon the message being communicated and provides a button at the bottom of the screen to proceed with the communication so that the prospect can signify his continuing interest in the topic. The more clicks that the prospect makes without exiting the program, presumably the higher the interest the prospect has in the message being delivered.

Figure 16:
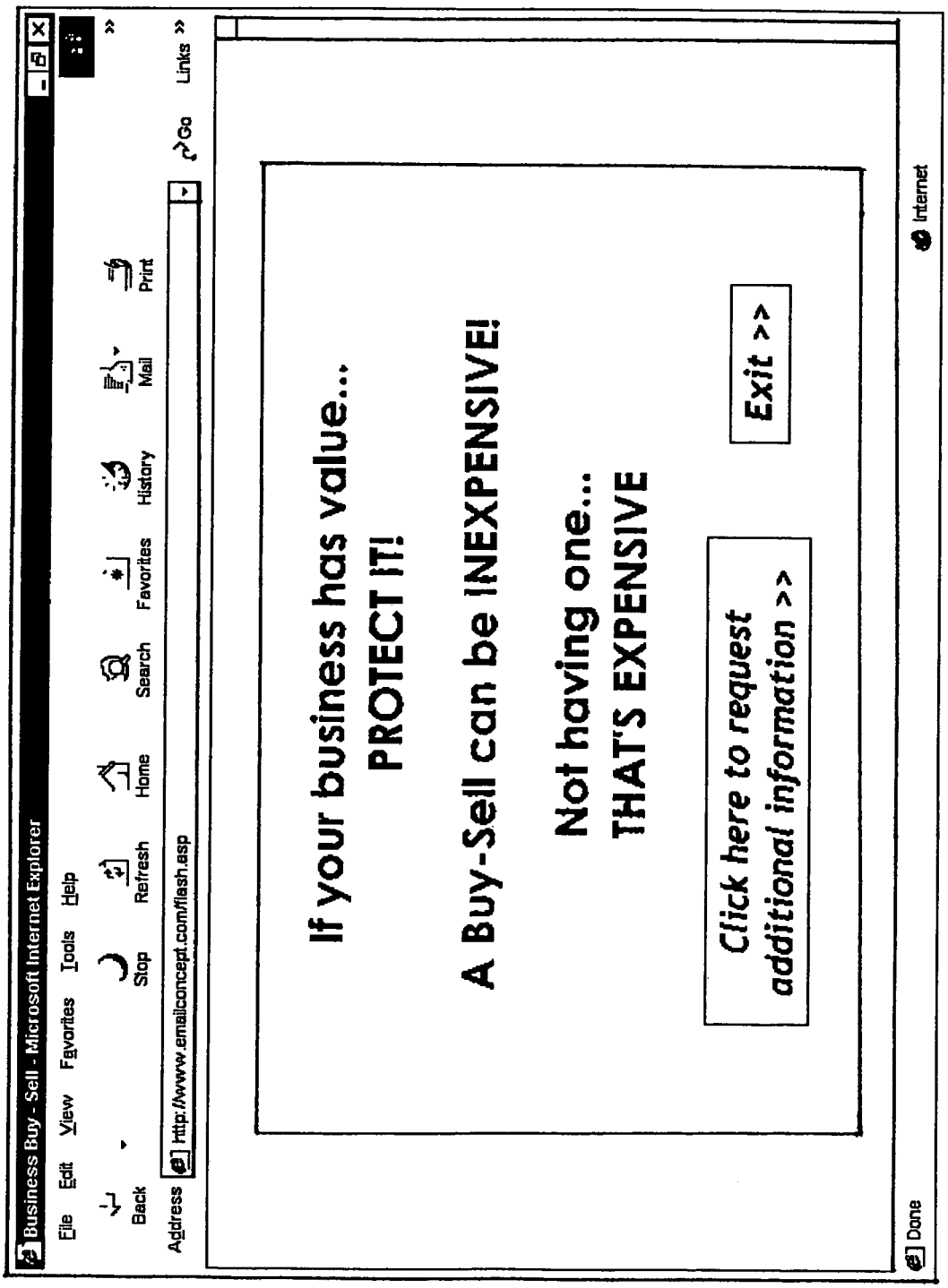
Figure 17:
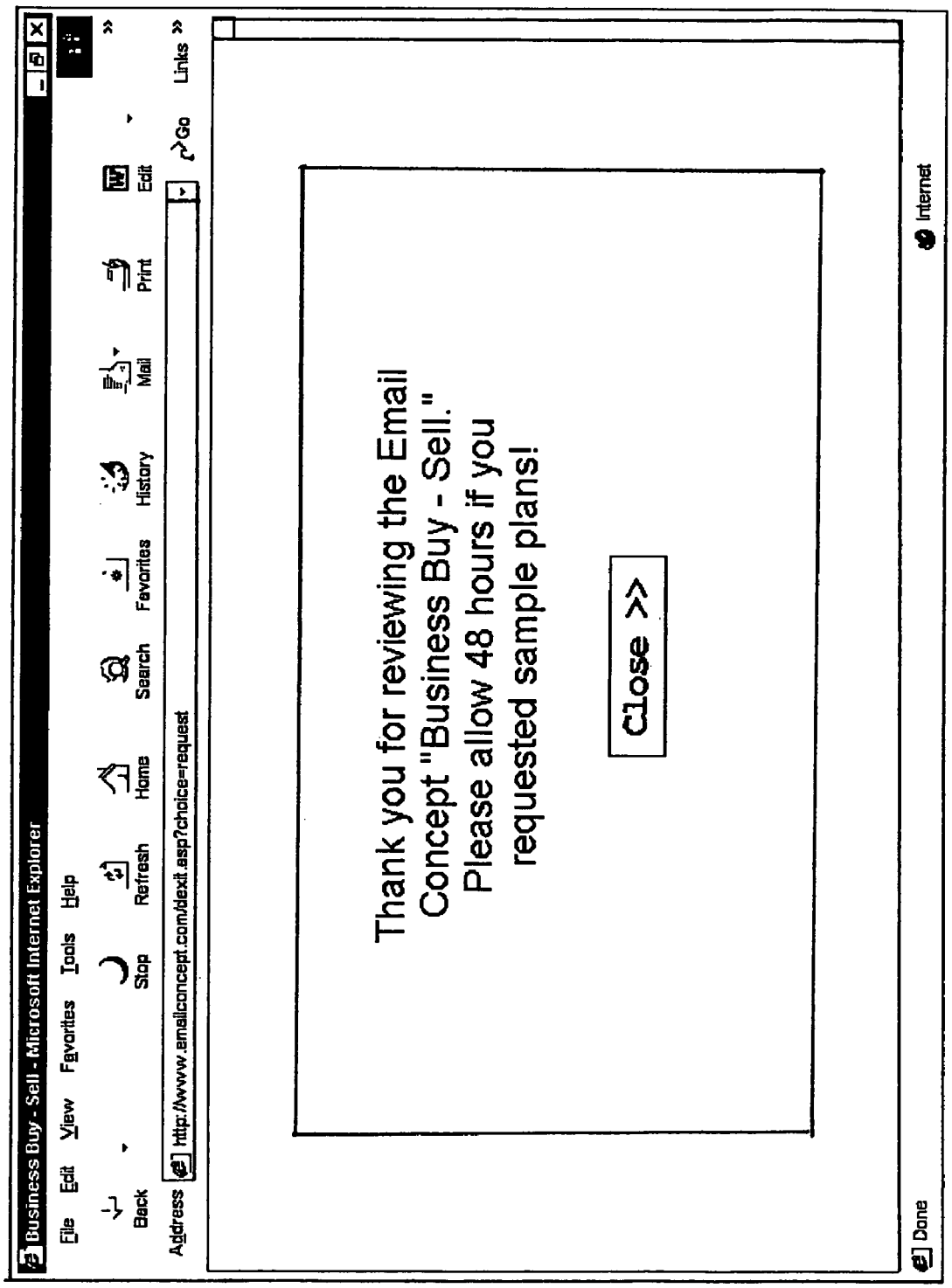

Finally, in FIG. 16, a button is provided on screen 60 which the prospect can click to further show his or her interest by requesting additional information. In a preferred embodiment, when this button is clicked, an email is generated by the website and sent to the salesperson who generated the original email to the prospect informing the salesperson of the progress of the prospect's visit to the website and, in particular, the fact that the prospect had requested additional information, as seen in box 64 in FIG. 18. The communication to the prospect closes in a screen 62 which then allows the prospect to close his or her browser.

In one embodiment of the invention, the email to the salesperson is sent reporting the outcome of the prospect's visit to the website, regardless of how many or few screens have been clicked. In another embodiment, no email is sent unless the prospect requests additional information.

In both cases, however, a statistics screen as seen in FIG. 20 may be compiled, again in a database reflecting information about who the prospect is (To), the topic of the communication (Concept) he or she was provided, the Date Sent, Date Opened by the prospect, whether the prospect made it to the ending screen of the communication, whether information was requested, and the number of times the communication was opened by the prospect. These statistics can be stored for any desired period of time on the website to provide the salesperson with continuing access to his prospect information. Alternatively, a supervisor to the salesperson may have access to the same information to monitor the salesperson's performance. The statistics page may also, as shown illustrate the number of times a communication (Concept) has been sent using the website.

The salesperson may respond to the email indicating that the prospect had requested additional information. Or, if no email is received, the salesperson can visit the statistics window at the website to gather data about the prospect to ascertain whether or not to make a follow up contact. The follow-up contact gives the salesperson the opportunity to show the product or service being offered and how it fulfills the need which has been highlighted in this series of messages in the communication.

It is a particularly advantageous feature of the preferred embodiments of this invention that the communication viewed by the prospect merely illustrates and exemplifies the existence of the problem, leaving it to the follow up contact by the salesperson to explain what the solution is to the problem and its benefits.

Figure 19:
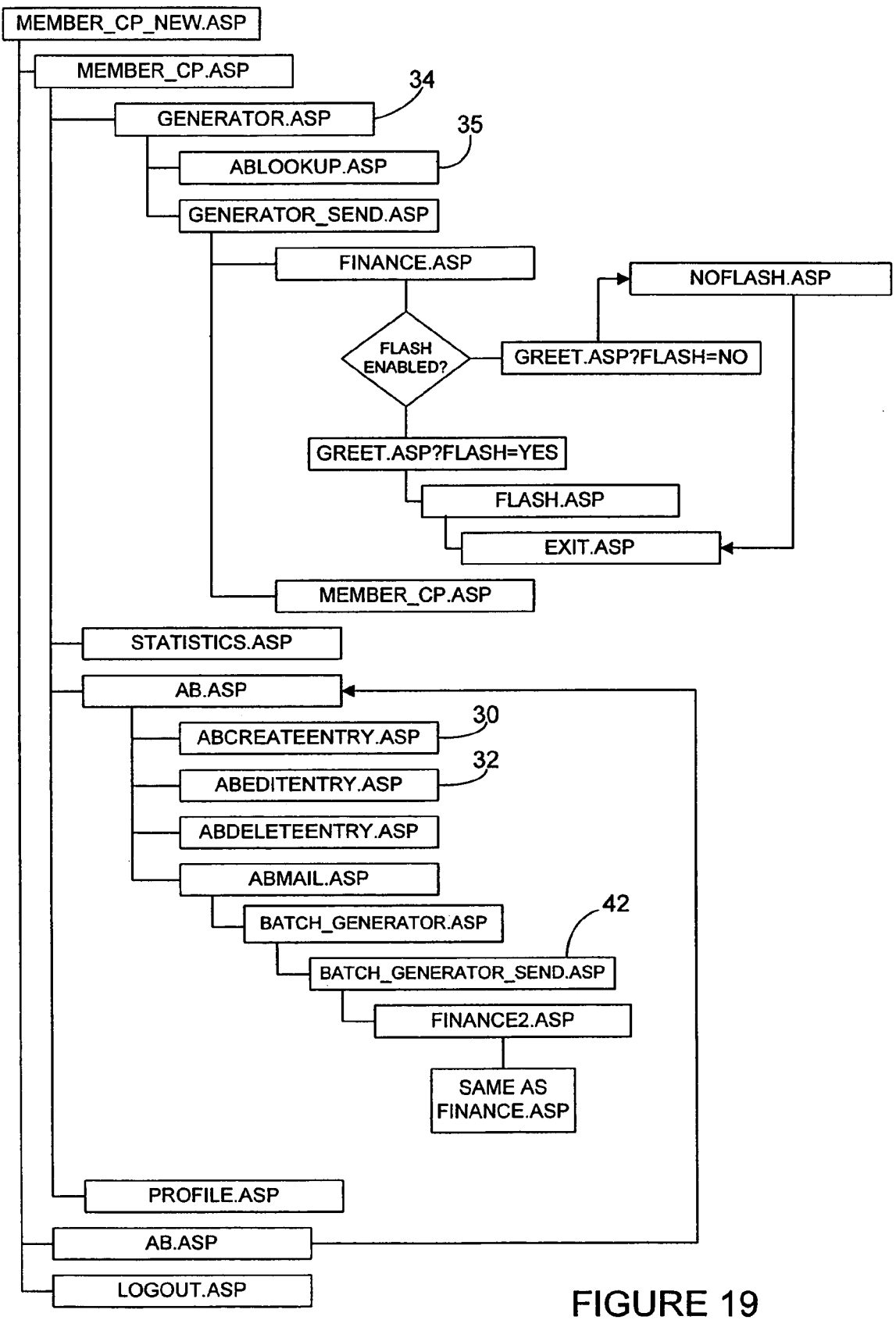
FIG. 19 is a flow chart of website processing in accordance with the invention.

Preferably, the processing of the website is based on a menu-driven series of options, as outlined in FIG. 19.

The invention can be used in any appropriate sales setting, including the sale of legal services. In a multi-disciplinary law firm, where cross selling is encouraged, this can be a useful tool to assist one attorney to cross sell other services within the firm. In addition, in marketing a restaurant, various messages building a relationship between the restaurant and the customer can be displayed on the screens shown to the prospect. In another embodiment, the messages illustrate the needs a company may face in handling payrolls, as a marketing tool for a payroll service company. Other suitable products and services may also be marketed in this way.

Those of ordinary skill in the art of programming websites will be able to prepare code to carry out the invention, based upon the disclosure hereof.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. An apparatus for sending a link in an email, the apparatus comprising:
   a processor;
   a machine-readable medium including instructions executable by the processor to:
   access a website by a salesperson
   the salesperson inputting an identification of a prospect to be sent an email including the prospect's email address and a first message to send to the prospect that includes a link to a website address configured to show the prospect a pre-defined sequence of screens presenting a second message to the prospect, wherein the salesperson selects one of a plurality of pre-defined screens stored on the website to be included to enable the screens' access using the link, send the email to the prospect including the link, and display the pre-defined sequence of screens to the prospect when accessed using the link.

2. An apparatus as claimed in claim 1 wherein the website enables the salesperson to send a batch of emails to prospects.

3. An apparatus as claimed in claim 1 wherein the website enables the salesperson to maintain an address book of multiple prospects.

4. An apparatus as claimed in claim 1 wherein the website enables the salesperson to customize the email message to a specific prospect and generate a unique website address link for the prospect.

5. An apparatus as claimed in claim 1 wherein the website enables the salesperson to store a prepared email message to use with various prospects.

6. An apparatus as claimed in claim 1 wherein the website enables the salesperson to preview the email message to the prospect.

7. An apparatus as claimed in claim 1 wherein the website presents information to the salesperson that an email message has been sent to a specific prospect.

8. An apparatus as claimed in claim 1 wherein the website stores information about a specific prospect's viewing of the communication including identification of the specific prospect and the communication viewed by the specific prospect.

9. An apparatus as claimed in claim 1 wherein the communication permits the prospect to indicate that more information is desired and the website that shows the sequence of screens records the indication that more information is desired for the salesperson.

10. An apparatus as claimed in claim 1 wherein the website sends an email to the salesperson when a specific prospect has reviewed the communication.

11. An apparatus as claimed in claim 1 wherein the website sends an email to the salesperson when a specific prospect has reviewed the communication and requested additional information.

12. An apparatus as claimed in claim 1 wherein the website stores communications useful to an insurance salesperson.

13. An apparatus as claimed in claim 1 wherein the website stores communications useful to a lawyer selling legal services.

14. An apparatus as claimed in claim 1 wherein the website stores communications useful to a restaurateur.

15. An apparatus as claimed in claim 1 wherein the website stores communications useful to a training organization to promote its training services.

16. An apparatus for aiding in a sales effort, the apparatus comprising: a processor; a machine-readable medium including instructions executable by the processor to:
  access a website by a salesperson having programming and storage of multiple messages,
  wherein the website permits the salesperson to select a desired message for the prospect to see,
  enables the salesperson to input an identification of a prospect to be sent an email including the prospect's email address and a message to be sent to the prospect that includes a link to a website address configured to show the prospect a sequence of problem-defining screens selected by the salesperson,
  preview the email message to the prospect, and send the email to the prospect including the link,
  presents information to the salesperson that an email message has been sent to the prospect,
  displays the sequence of problem-defining screens to the prospect when accessed using the link, including multiple screens viewable by the prospect in sequence, provoked by the prospect, and
  wherein the ending screen permits the prospect to indicate that more information is desired and records this data for the salesperson,
  stores information about the prospect's viewing of the sequence of problem-defining screens,
  sends an email to the salesperson when the prospect has reviewed the sequence of problem-defining screens and requested additional information, and
  enables the salesperson to maintain an address book of multiple prospects and send a batch of emails to prospects.

17. A method of marketing comprising:
  contacting a prospect to inquire if the prospect would be receptive to an email pertinent to a product or service to be marketed,
  sending an email to the prospect including a link to a website address configured to show the prospect a predefined sequence of problem-defining screens about a subject matter;
  wherein a salesperson selects one of a plurality of the predefined sequence of problem-defining screens stored on the website to be included to enable the screens' access using the link,
  when the prospect accesses the website address using the link, displaying the sequence of problem-defining screens to the prospect, and
  following up the prospect's interest in the subject matter of the sequence of problem-defining screens with a personal contact to provide further details about the product or service being marketed.

18. A method as claimed in claim 17 wherein sending includes sending a batch of emails to prospects.

19. A method as claimed in claim 17 further comprising maintaining an address book of multiple prospects.

20. A method as claimed in claim 17 wherein sending includes customizing the email message to a specific prospect.

21. A method as claimed in claim 17 wherein sending includes sending a stored email message to the prospect.

22. A method as claimed in claim 17 further comprising previewing the email message before sending the email message to the prospect.

23. A method as claimed in claim 17 further comprising observing information that an email message has been sent to a specific prospect.

24. A method as claimed in claim 17 wherein displaying includes displaying multiple screens to the prospect.

25. A method as claimed in claim 17 wherein displaying includes displaying multiple screens viewable by the prospect in a predefined sequence, with progress through the sequence being provoked by the prospect.

26. A method as claimed in claim 17 further comprising storing information about a specific prospect's viewing of the communication including identification of the specific prospect and the communication viewed by the specific prospect.

27. A method as claimed in claim 17 further comprising prompting the prospect to indicate that more information is desired and at the website, recording an indication that the prospect desires more information for the salesperson.

28. A method as claimed in claim 17 further comprising sending emails to the salesperson as specific prospects have reviewed at least one of the sequence of screens.

29. A method as claimed in claim 17 further comprising sending an email to the salesperson when the prospect has reviewed at least one of the sequence of screens and requested additional information.

30. A method as claimed in claim 17 further comprising selecting a desired set of screens for the prospect to see from multiple stored sets.

31. A method as claimed in claim 17 wherein sending an email to the prospect includes sending a link to a website address configured to show the prospect a desired set of screens about a subject matter pertinent to insurance.

32. A method as claimed in claim 17 wherein sending an email to the prospect includes sending a link to a website address configured to show the prospect a desired set of screens about a subject matter pertinent to legal services.

33. A method as claimed in claim 17 wherein sending an email to the prospect includes sending a link to a website address configured to show the prospect a desired set of screens about a subject matter pertinent to a restaurant.

34. A method of marketing comprising:
maintaining an address book of multiple prospects,
contacting the prospects to inquire if the prospects would be receptive to an email pertinent to a product or service to be marketed,
previewing email messages, sending a batch of emails to the prospects, each email including a link to a website address configured to show the recipient prospect a selected sequence of problem-defining screens about a subject matter,
wherein a salesperson selects from a plurality of sequences stored on the website a desired sequence of problem-defining screens for each prospect to see from a plurality of stored sequences to be included to enable the sequences' access using the link,
observing information that email messages have been sent to the prospects, when the recipient prospects access the website using the link,
displaying the selected sequence of problem-defining screens to each prospect on multiple screens viewable by the prospect in sequence, provoked by the prospect,
prompting the prospect to indicate that more information is desired and recording such indications,
storing information about the prospects' interest in the subject matter of the sequence of problem-defining screens with personal contacts to provide further details about the product or service being marketed.

35. An apparatus for aiding in an insurance sales effort, the apparatus comprising: a processor; a machine-readable medium including instructions executable by the processor to:
access a website by a salesperson; enable the salesperson to input an identification of a prospect to be sent an email including the prospect's email address and a first message to send to the prospect that includes a link to a website address configured to show the prospect a sequence of screens presenting a second message illustrating various consequences arising from a lack of insurance coverage,
wherein the salesperson selects from the website a desired sequence of problem-defining screens for each prospect to see from a plurality of stored sequences,
send the email to the prospect including the link, and
display the sequence of screens to the prospect when accessed using the link.

* * * * *